United States Patent
De Souza Santos et al.

(10) Patent No.: US 11,939,066 B2
(45) Date of Patent: Mar. 26, 2024

(54) FAIL SAFE MULTI-ENGINE TURBOPROP AIRFRAME THERMO-PNEUMATIC ANTI-ICING SYSTEMS

(71) Applicant: EMBRAER S.A., São José dos Campos (BR)

(72) Inventors: Daniel Parrode Fraia De Souza Santos, São José dos Campos (BR); Nicolau Braga Santos, São José dos Campos (BR); Daniel Martins Da Silva, São José dos Campos (BR)

(73) Assignee: EMBRAER S.A., São José Dos Campos (BR)

( * ) Notice: Subject to any disclaimer, the term of this patent is extended or adjusted under 35 U.S.C. 154(b) by 204 days.

(21) Appl. No.: 17/690,815

(22) Filed: Mar. 9, 2022

(65) Prior Publication Data

US 2023/0286659 A1     Sep. 14, 2023

(51) Int. Cl.
| | |
|---|---|
| *B64D 15/04* | (2006.01) |
| *B64D 13/06* | (2006.01) |
| *B64D 41/00* | (2006.01) |
| *B64D 27/10* | (2006.01) |

(52) U.S. Cl.
CPC ............. *B64D 15/04* (2013.01); *B64D 13/06* (2013.01); *B64D 41/00* (2013.01); *B64D 2013/0607* (2013.01); *B64D 2013/0611* (2013.01); *B64D 2013/0618* (2013.01); *B64D 27/10* (2013.01)

(58) Field of Classification Search
CPC .................... B64D 15/04; B64D 27/10; B64D 2013/0607; B64D 2013/0611; B64D 2013/0618
See application file for complete search history.

(56) References Cited

U.S. PATENT DOCUMENTS

| | | | |
|---|---|---|---|
| 10,293,945 B2 * | 5/2019 | Hoffjann | ................. F25B 27/00 |
| 10,502,145 B2 * | 12/2019 | DeRoy | ...................... F02C 9/52 |
| 11,091,271 B2 | 8/2021 | Casado-Montero et al. | |

(Continued)

FOREIGN PATENT DOCUMENTS

EP     3 323 727     5/2018

*Primary Examiner* — Michael H Wang
(74) *Attorney, Agent, or Firm* — NIXON & VANDERHYE P.C.

(57) ABSTRACT

Thermo-pneumatic anti-icing systems include port and starboard anti-icing subsystems operatively interconnecting heated engine bleed air discharged from port side and starboard side turboprop engines with port and starboard airfoils, respectively, associated with an aircraft to thereby provide in-flight anti-icing protection to the port and starboard airfoils, and an auxiliary power unit (APU) capable of discharging a supply of heated APU bleed air to the port and starboard anti-icing subsystems during an abnormal single engine or a single pneumatic bleed air operational condition. A controller may command respective port and starboard cross bleed valves to open and thereby allow the APU bleed air to be supplied to the one port or starboard anti-icing subsystem that is incapable of delivering heated engine bleed air from the port side turboprop engine or the starboard side turboprop engine, respectively. The port and starboard airfoils are thus each protected against inflight icing during the abnormal single engine or single pneumatic bleed air operational condition.

11 Claims, 2 Drawing Sheets

(56) References Cited

U.S. PATENT DOCUMENTS

Figure 1:
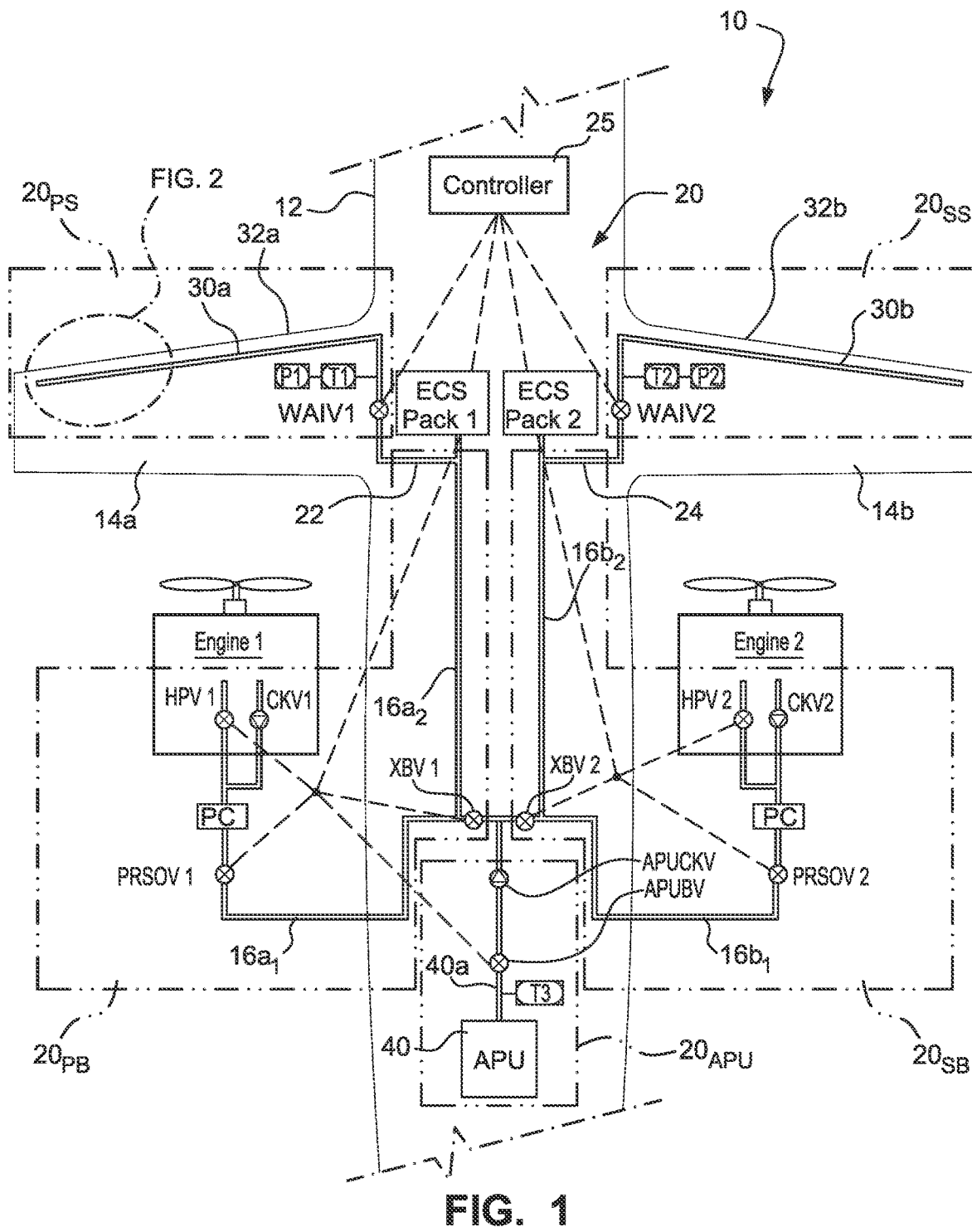

| | | | |
|---|---|---|---|
| 11,391,219 B2 * | 7/2022 | Smith | F04D 27/0223 |
| 2018/0037327 A1 * | 2/2018 | Hoffjann | B64D 41/00 |
| 2019/0057560 A1 * | 2/2019 | Chopra | G05B 23/0237 |
| 2021/0001991 A1 | 1/2021 | Martino-Gonzalez et al. | |

* cited by examiner

FAIL SAFE MULTI-ENGINE TURBOPROP AIRFRAME THERMO-PNEUMATIC ANTI-ICING SYSTEMS

FIELD

The embodiments disclosed herein relate generally to airframe (e.g., airfoil leading edge) anti-icing systems and methods that are especially useful for multi-engine turboprop aircraft. In especially preferred forms, the embodiments disclosed herein are directed toward fail safe thermo-pneumatic anti-icing systems for multi-engine turboprop aircraft that provide anti-icing protection to all airfoils even during abnormal single engine operational conditions (e.g., a partial engine-out scenario whereby only a single engine is fully operational and/or a failure of one of the port or starboard pneumatic bleed subsystems).

BACKGROUND

Airframe ice protection on turbine propeller (colloquially termed "turboprop") aircraft is typically accomplished by de-icing boots on the leading edges of the airfoils. Conventional de-icing boots are elongate inflatable rubber components that are bonded to the aircraft's airfoil leading edges. When inflated by bleed air from the turbine engines, the boots will thus expand so as to break up ice that has accreted on the leading edges so that the accreted ice can be removed from the leading edges in the airfoil's slipstream.

Inflatable de-icing boots are common components of a de-icing system for turboprop aircraft because they are very economical in terms of bleed air use since there is very limited bleed air available from the turbine engines. One of the disadvantages of inflatable de-icing boots, however, is that they require the use of some bleed air operating vacuum pumps in order to maintain a deflated state when they are not required to be placed into service. Further, the boots will typically have a useful life of 3000 to 5000 flight hours (e.g., about 1 or 2 years for commercial aircraft) following which they have to be removed with the aid of chemical solvents so that new boots can be installed. Such a boot replacement process is long and labor intensive thereby leading to undesirable aircraft down time. Moreover, the boots are prone to being punctured which in turn causes the entire de-icing system to be unavailable when needed.

Other de-icing systems that are less common include electro-expulsive systems and freeze point depressant systems (also known as a "weeping wing"). Conventional electro-expulsive systems employ electromagnetic actuators that are embedded in an airfoil immediately aft of the airfoil's leading edge along with a heating strip embedded at the leading edge such that, when activated by the aircraft's on-board electrical power, the electromagnetic actuators vibrate sufficiently to break up accreted ice at the airfoil's leading edge. While electro-expulsive systems are typically light weight and use only a small amount of electrical power, they have several disadvantages including noise issues in use, material fatigue, fuel vapor incompatibility issues and inadequate failure modes.

Freeze point depressant systems employ airfoil leading edges that have a large number of microscopic perforations which allow a glycol solution (typically ethylene glycol) from an on-board supply to be pumped therethrough. The glycol therefore is deposited on the leading edges to depress the freeze point of the water droplets impinging thereon and thereby avoid freezing. Freeze point depressant systems required the aircraft operator to provide an onboard supply of ethylene glycol which in turn reduces payload. Moreover, ethylene glycol is a known environmental contaminant and thus its use is discouraged for such reason.

Electro-thermal de-icing systems employ a metallic mesh attached to a back surface of a leading edge skin. When activated by on-board electrical power, the leading edge skin is heated to prevent melt any accreted ice and/or to prevent water from freezing and accumulating.

Thermo-pneumatic systems are also known whereby heated bleed air from an aircraft's engine compressor may also be supplied to perforated tubes (conventionally called "piccolo tubes") positioned in an interior region adjacent an airfoil's leading edge. The heated bleed air is therefore expelled through the perforations in the piccolo tube so as to impinge on the interior surface of the leading edge thereby heating the leading edge to melt any accreted ice on the exterior surface and/or to prevent water from freezing on the exterior leading edge surface. One significant drawback to conventional thermo-pneumatic systems is that each of the turbine engines will supply only a part of the piccolo tubes associated on the side of the aircraft where the engine is located. Thus, a starboard engine will typically supply piccolo tubes on the starboard side of the airframe while a port engine will typically supply piccolo tubes on the port side of the airframe. Such a system is therefore a disadvantage during abnormal (e.g., single) engine operation whereby one of the engines cannot develop sufficient power to supply the bleed air necessary to preform anti-icing functions.

It would therefore be highly desirable if a thermo-pneumatic system could be provided for multi-engine turboprop aircraft which is capable to supply all piccolo tubes on each side of the airframe during abnormal operations, for example, when the pneumatic bleed subsystem associated with a non-operational engine and/or a failure of such pneumatic bleed subsystem is not able to provide heated engine bleed air to its respective airfoil(s). It is towards supplying such a system that the embodiments disclosed herein are directed.

SUMMARY OF DISCLOSED EMBODIMENTS

Broadly, the embodiments disclosed herein are directed toward thermo-pneumatic de-icing systems having a fail-safe mode whereby anti-icing capabilities may be provided to both port and starboard airfoils requiring in-flight anti-icing protection in the event of a single engine condition or a failed port or starboard pneumatic bleed subsystem whereby only one of the port or starboard pneumatic bleed subsystems remains fully operational to supply heated engine bleed air to its respective airfoil while the other subsystem has failed and is incapable of supplying heated engine bleed air to its respective airfoil (e.g., due to partial or complete failure of the port or starboard engine or partial or complete failure of the entire port or starboard pneumatic bleed subsystem).

According to certain embodiments the thermo-pneumatic anti-icing system will include port and starboard pneumatic bleed subsystems operatively interconnecting heated engine bleed air discharged from port side and starboard side turboprop engines with port and starboard airfoils, respectively, associated with the aircraft to thereby provide in-flight anti-icing protection to the port and starboard airfoils, and an auxiliary power unit (APU) capable of discharging a supply of heated APU bleed air to the port and starboard anti-icing subsystems. Normally closed port and starboard cross bleed valves XBV1 and XBV2 are associated operatively with the supply of heated APU bleed air to thereby allow the heated APU bleed air to be directed to the port and starboard airfoils when opened, respectively. A controller which issues a control signal to either the XBV1 or the XBV2 in response to a single engine operational condition or a single pneumatic bleed subsystem failure is provided when one of the port or starboard pneumatic bleed subsystems is incapable of delivering heated engine bleed air from the port side turboprop engine or the starboard side turboprop engine, respectively. The control signal thereby respectively opens the XBV1 or the XBV2 and allows the APU bleed air to be supplied to the one port or starboard pneumatic bleed subsystem that was previously incapable of delivering heated engine bleed air from the port side turboprop engine or the starboard side turboprop engine, respectively. In such a manner, therefore, the port and starboard airfoils are each protected against inflight icing during the abnormal single engine or single pneumatic bleed operational condition.

The port and starboard anti-icing subsystems may comprise a port piccolo tube and a starboard piccolo tube which receive heated engine bleed air from the port side and starboard side turboprop engines and direct the heated engine bleed air against an interior leading surface of port and starboard airfoils, respectively.

According to some embodiments, the APU comprises an APU bleed air supply line which is connected to the port and starboard pneumatic bleed air branch lines. The XBV1 and XBV2 may thus be operatively associated with the port and starboard pneumatic bleed subsystems so as to supply heated APU bleed air from the APU bleed air supply line when opened to the piccolo tubes operatively associated with the port and starboard anti-icing subsystems, respectively.

The port and starboard pneumatic bleed subsystems in certain embodiments will includes a port side normally closed pressure regulating shut-off valve (PRSOV1) and a starboard side normally closed pressure regulating shut-off valve (PRSOV2) connected operatively to the controller to controllably supply heated engine bleed air from the port side and starboard side engines to the port and starboard anti-icing subsystems, respectively.

The system may optionally be provided with port and starboard environmental control (ECS) packs which are pneumatically connected to the heated engine bleed air discharged from the port side and starboard side turboprop engines of the port and starboard pneumatic bleed subsystems, respectively, for controlling the aircraft's environmental condition (e.g., interior cabin air flow and/or temperature). The port and starboard pneumatic bleed subsystems may also include port and starboard pneumatic branch lines upstream of the port and starboard ECS packs and upstream relative to the port and starboard anti-icing subsystems, respectively. The port and starboard anti-icing subsystems may therefore include port and starboard anti-icing valves operatively connected to the controller to control supply of heated engine bleed air from the port side and starboard side engines associated with the port and starboard pneumatic bleed subsystems to the port and starboard piccolo tubes, respectively.

Some embodiments of the system will allow the controller to controllably modulate the port and starboard anti-icing valves to maintain a substantially balanced supply of heated engine bleed air energy to the port and starboard piccolo tubes during the abnormal single engine operating condition. The system according to claim 7, wherein the controller includes storage data associated with mass flow curves of the port and starboard piccolo tubes, and modulates the port and starboard anti-icing valves according to the equation:

$$EBAT \times EBAF = APUBAT \times APUBAF,$$

where EBAT and EBAF are the temperature (K) and flow (kg/s), respectively, of the bleed air from the normally operating engine and APUBAT and APUBAF are the temperature and flow, respectively, of the bleed air from the APU.

These and other aspects and advantages of the present invention will become more clear after careful consideration is given to the following detailed description of the preferred exemplary embodiments thereof.

BRIEF DESCRIPTION OF ACCOMPANYING DRAWINGS

Figure 2:
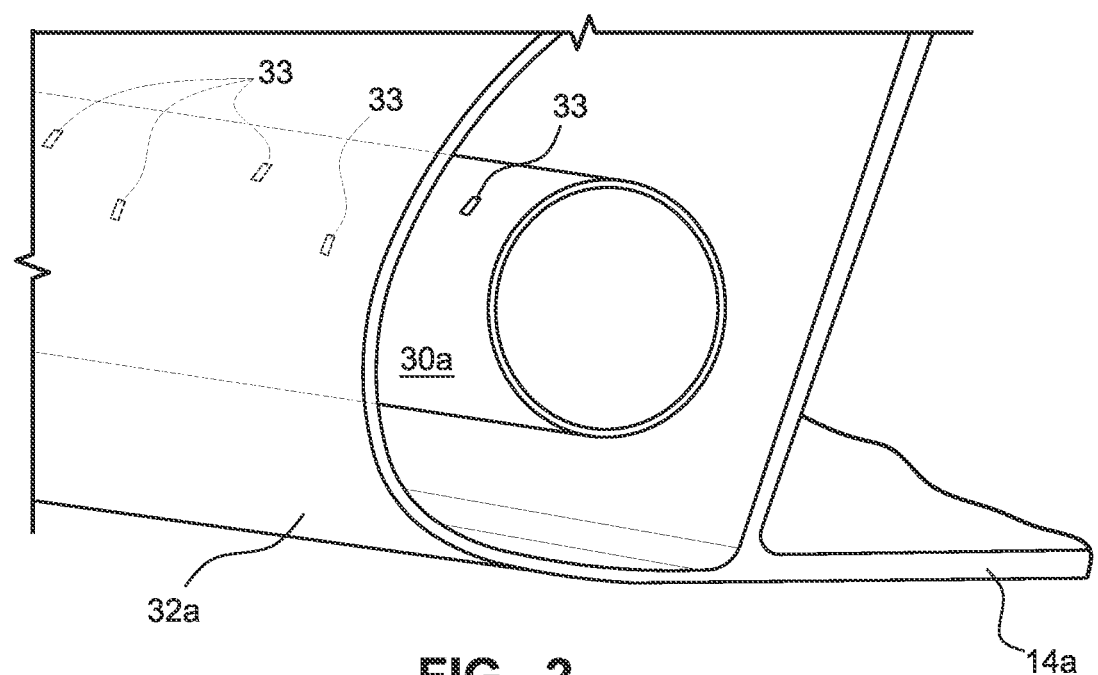

The disclosed embodiments of the present invention will be better and more completely understood by referring to the following detailed description of exemplary non-limiting illustrative embodiments in conjunction with the drawings of which:

FIG. 1 is schematic x-ray view of a multi-engine turboprop aircraft provided with a fail-safe thermo-pneumatic anti-icing system in accordance with an embodiment of the present invention; and FIG. 2 is a detailed view of a typical wing leading edge employed in the system depicted in FIG. 1.

DETAILED DESCRIPTION OF EMBODIMENTS

Accompanying FIG. 1 schematically depicts a multi-engine turboprop aircraft 10 provided with a thermo-pneumatic anti-icing system 20 having port and starboard side anti-icing subsystems $20_{PS}$ and $20_{SS}$ which are operatively associated with port and starboard pneumatic bleed subsystems $20_{PB}$ and $20_{SB}$, respectively, in accordance with an embodiment of the present invention. As shown, the aircraft 10 includes a fuselage 12 with port and starboard wings 14a, 14b extending therefrom. The aircraft 10 is a multi-engine aircraft since it is provided with a port engine (Engine 1) and a starboard engine (Engine 2) each of which is operatively connected to the respective port and starboard pneumatic bleed subsystems $20_{PB}$ and $20_{SB}$. As shown, the bleed air pneumatic circuitry of the port pneumatic bleed subsystem $20_{PB}$ includes bleed air supply lines 16a1, 16a2 which supply heated bleed air from the port engine (Engine 1) while the starboard pneumatic bleed subsystem $20_{SB}$ includes bleed air supply lines 16b1, 16b2 which supply heated bleed air from the starboard engine (Engine 2). The bleed air from Engine 1 and Engine 2 is also supplied to an environmental control system (ECS) Pack 1 and ECS Pack 2 via bleed air supply lines 16a2 and 16b2, respectively, so as to control cabin environmental conditions (e.g., cabin air flow and temperature).

The port and starboard anti-icing subsystems $20_{PS}$ and $20_{SS}$ are provided with piccolo tubes 30a, 30b extending along the leading edges 32a, 32b of the port and starboard wings 14a, 14b and associated wing anti-ice valves (WAIV) identified as WAIV1 and WAIV2, respectively. Pneumatic branch lines 22, 24 pneumatically connect the bleed air supply lines 16a2 and 16b2 associated with the port and starboard bleed air subsystems $20_{PB}$, $20_{SB}$ upstream of the ECS Pack 1 and ECS Pack 2 so as to deliver heated bleed air from Engine 1 and Engine 2 to the port and starboard piccolo tubes 30a, 30b, respectively. Activation of the WAIV1 and WAIV2 is accomplished by the controller 25 issuing a command signal when the anti-ice system 20 is to be operational. Such a command signal may be automatically generated in response to detection of ice by the aircraft sensors (not shown) and/or by manual activation by the pilot of the aircraft 10. Thus, in response to a command signal issuing from the controller 25, the WAIV1 and WAIV2 will open to supply heated air to the port and starboard piccolo tubes 30a, 30b via the port and starboard bleed air subsystems $20_{PB}$, $20_{SB}$, respectively.

The port and starboard anti-icing subsystems $20_{PS}$, $20_{SS}$ may also include pressure and temperature sensors P1, T1 and P2, T2 so as to sense the pressure and temperature conditions of the heated bleed air being supplied to the piccolo tubes 30a, 30b via the port and starboard pneumatic bleed subsystems $20_{PB}$, $20_{SB}$, respectively. Each of the pressure and temperature sensors P1, T1 and P2, T2 is in operative communication with the controller 25 so the latter is provided with the pressure and temperature conditions of such heated bleed air being supplied to the piccolo tubes 30a, 30b. It is noted that the temperature sensors T1, T2 may be positioned in operative association anywhere in the port and starboard subsystems $20_{PB}$, $20_{SB}$ downstream of the port side normally closed pressure regulating shut-off valve (PRSOV1) and the starboard side normally closed pressure regulating shut-off valve (PRSOV2), respectively.

The piccolo tube 30a is shown in FIG. 2 and is likewise representative of the piccolo tube 30b. As shown therein, the piccolo tube 30a includes a series of forwardly directed apertures 33 that allow the heated bleed air directed into the tube to impinge upon the interior surface of the leading edge 32a thereby heating the same and melting any accreted ice on the exterior surface of such leading edge 32a.

The controller 25 is also operatively connected by signal lines to the high pressure valves (HPV) identified as HPV1 and HPV2 associated with Engine 1 and Engine 2, as well as the operating valves identified as PRSOV1 and PRSOV2 operatively pneumatically associated with the bleed air supply lines 16a1 and 16b1, respectively. During normal operation therefore, bleed air will be supplied to the ECS Pack 1 and ECS Pack 2 via bleed air supply lines 16a1, 16a2 and 16b1, 16b2 via operation by the controller 25 of the HPV1, PRSOV1 and the HPV2, PRSOV2, respectively. Further during such normal operation, as noted above the WAIV1 and WAIV2 will allow a portion of the bleed air to be directed to the piccolo tubes 30a, 30b when commanded by the controller 25.

Important to the embodiment disclosed herein is the provision of an auxiliary power unit (APU) pneumatic bleed system $20_{APU}$ which includes an on-board APU 40. As shown in FIG. 1, the APU 40 is provided with an APU bleed air supply line 40a that is pneumatically connected to each of the bleed air supply lines 16a1, 16a2 and 16b1, 16b2 through cross bleed valves (XBV) identified by XBV1 and XBV2 associated with the port and starboard pneumatic bleed air subsystems $20_{PB}$, $20_{SB}$, respectively. The APU bleed air supply line 40a includes an APU bleed valve (APUBV) which is connected operatively via a signal line to the controller 25. Actuation of the APUBV will therefore open the APUBV to allow bleed air from the APU to flow into the bleed air supply line 40a through an APU check valve (APUCKV) to the cross bleed valves XBV1 and XBV2. Each of the normally closed cross bleed valves XBV1 and XBV2 is independently operatively connected to the controller 25 via signal lines so as to be operated (opened) when needed to supply heated bleed air from the APU to either the bleed air supply line 16a2 or the bleed air supply line 16b2. The temperature of the heated bleed air supplied by the APU 40 may be sensed by a temperature sensor T3 in operative communication with the controller 25 that may operatively be associated with the supply line 40a at any position downstream of the APU 40 and upstream of the SBV1 and SBV2.

During an abnormal operation, e.g., one of Engine 1 or Engine 2 is incapable of delivering sufficient heated bleed air to the piccolo tubes 30a, 30b, respectively, the controller 25 may then issue a command signal to effectively allow heated bleed air to be supplied by the APU to the side of the aircraft having the abnormally operating Engine 1 or Engine 2 or an abnormally operating port and starboard anti-icing subsystems $20_{PS}$, $20_{SS}$, respectively. By way of example, should the port side Engine 1 fail or be compromised in any way so it cannot deliver sufficient bleed air, or should the port pneumatic bleed subsystem $20_{PS}$ become nonoperational, the controller 25 may then issue respective command signals which close HPV1 and PRSOV1 and opens APUBV and XBV1. Such command signals will then allow heated bleed air from the APU to be delivered to the piccolo tube 30a on the port side of the aircraft 10 via the supply line 16a2 and the operation of WAIV1. A similar control scheme would be available should the starboard Engine 2 fail or be compromised in any way such that it cannot deliver sufficient bleed air or should the starboard pneumatic bleed subsystem $20_{SS}$ become nonoperational, in which case the controller 25 would close the HPV2 and PRSOV2 and open the APUBV and the XBV2. Thus, by the term "single engine operational condition" is meant that only one of the port or starboard pneumatic bleed subsystems $20_{PS}$, $20_{SS}$, respectively, remains fully operational to supply heated engine bleed air to its respective airfoil while the other subsystem has failed and is incapable of supplying heated engine bleed air to its respective airfoil (e.g., due to a failure of one of the port or starboard engines (i.e., Engine 1 or Engine 2) or a failure of one of the port or starboard pneumatic bleed subsystems $20_{PS}$, $20_{SS}$, respectively).

As may be appreciated, during an abnormal anti-icing condition in response to a single engine operational condition (i.e., when one of the port or starboard engines Engine 1 or Engine 2, respectively, is not fully operational), the temperature of the bleed air delivered by the APU will have a different temperature as compared to the bleed air delivered by the engine that is operating normally. Thus, in order to maintain a balanced anti-icing system the wing anti-ice valves (WAIV1 or WAIV2) will be modulated by the controller 25 to maintain a heated bleed air supply of substantially equal energy to both the piccolo tubes 30a and 30b. Such a balanced energy system is achieved by programming the controller 25 with the mass flow curve for each of the piccolo tubes 30a and 30b. Since the mass flow curve is a function of pressure and temperature, by measuring the temperature of the bleed air being supplied to the wing anti-ice valve by the normally operating engine, the input pressure on the opposite side of the pneumatic anti-icing system 20 may then be modulated based on the measurement of the bleed air supplied by the APU using the equation:

$$EBA_T \times EBA_F = APUBA_T \times APUBA_F$$

where $EBA_T$ and $EBA_F$ are the temperature (K) and flow (kg/s), respectively, of the bleed air from the normally operating engine and $APUBA_T$ and $APUBA_F$ are the temperature and flow, respectively, of the bleed air from the APU.

Thus the sensed temperatures of the respective bleed air obtained by the sensors T1 and T2 associated with the port and starboard pneumatic bleed subsystems $20_{PS}$ and $20_{SS}$, respectively, as well as the sensor T3 associated with the APU 40 are sent to the controller 25 via suitable signal connections therebetween. The controller 25 will also store in memory the mass flow curves for each of the piccolo tubes 30a and 30b. Thus, in the event of an engine failure, the controller 25 will calculate the necessary flow rates of the bleed air from the remaining normally operating engine and the APU 40 and will responsively modulate the wing anti-ice valves WAIV1 and WAIV2 to ensure energy balance is delivered to both the port side and the starboard side pneumatic bleed subsystems $20_{PS}$ and $20_{SS}$, respectively.

While reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. A thermo-pneumatic anti-icing system for a multi-engine turboprop aircraft comprising:
   (i) port and starboard pneumatic bleed air subsystems adapted to provide a supply of heated engine bleed air discharged from port side and starboard side turboprop engines of the aircraft;
   (ii) port and starboard anti-icing subsystems operatively interconnecting the port and starboard pneumatic bleed air subsystems with port and starboard airfoils associated with the aircraft to thereby provide in-flight anti-icing protection to the port and starboard airfoils, respectively;
   (iii) an auxiliary power unit (APU) capable of discharging a supply of heated APU bleed air to the port and starboard anti-icing subsystems;
   (iv) normally closed port and starboard cross bleed valves XBV1 and XBV2 associated operatively with the port and starboard pneumatic bleed air subsystems and pneumatically connected to the APU so as to supply, when opened, heated APU bleed air to the port and starboard airfoils, respectively; and
   (v) a controller which issues a control signal to either the XBV1 or the XBV2 in response to a single engine operational condition wherein one of the port or starboard pneumatic bleed air subsystems is incapable of delivering heated engine bleed air from the port side turboprop engine or the starboard side turboprop engine, respectively, the control signal thereby respectively opening the XBV1 or the XBV2 and allow the APU bleed air to be supplied to the one of the port anti-icing subsystem or the starboard anti-icing subsystem that is incapable of delivering heated engine bleed air from the port side turboprop engine or the starboard side turboprop engine, respectively, whereby the port and starboard airfoils are each protected against inflight icing during the abnormal single engine anti-icing operational condition.

2. The system according to claim 1, wherein the port and starboard anti-icing subsystems comprise a port piccolo tube and a starboard piccolo tube which receive heated engine bleed air from the port side and starboard side turboprop engines supplied by the port and starboard pneumatic bleed air subsystems and direct the heated engine bleed air against an interior leading surface of port and starboard airfoils, respectively.

3. The system according to claim 2, wherein the APU comprises an APU bleed air supply line and port and starboard bleed air branch lines pneumatically connected to the APU bleed air supply line.

4. The system according to claim 3, wherein the XBV1 and XBV2 are operatively associated with the port and starboard bleed air branch lines so as to supply heated APU bleed air from the APU bleed air supply line when opened to the port and starboard piccolo tubes, respectively.

5. The system according to claim 2, further comprising port and starboard environmental control (ECS) packs pneumatically connected to the heated engine bleed air discharged from the port side and starboard side turboprop engines, respectively, for controlling at least one environmental condition within the aircraft.

6. The system according to claim 5, wherein the port and starboard pneumatic bleed air subsystems include port and starboard pneumatic branch lines upstream of the port and starboard ECS packs which are pneumatically connected to the port and starboard anti-icing subsystems, respectively.

7. The system according to claim 6, wherein the port and starboard anti-icing subsystems include port and starboard anti-icing valves operatively connected to the controller to control supply of heated engine bleed air from the port side and starboard side engines to the port and starboard piccolo tubes, respectively.

8. The system according to claim 6, wherein the controller controllably modulates the port and starboard anti-icing valves to maintain a substantially balanced supply of heated engine bleed air energy to the port and starboard piccolo tubes during the abnormal engine operating condition.

9. The system according to claim 8, wherein the controller includes data stored in non-volatile memory associated with mass flow curves of the port and starboard piccolo tubes, and modulates the port and starboard anti-icing valves according to the equation:

$$EBA_T \times EBA_F = APUBA_T \times APUBA_F,$$

where $EBA_T$ and $EBA_F$ are the temperature (K) and flow (kg/s), respectively, of the bleed air from the normally operating engine and $APUBA_T$ and $APUBA_F$ are the temperature and flow, respectively, of the bleed air from the APU.

10. The system according to claim 1, wherein the port and starboard pneumatic bleed air subsystems include a port operating valve (PRSOV1) and a starboard operating valve (PRSOV2) connected operatively to the controller to controllably supply heated engine bleed air from the port side and starboard side engines to the port and starboard airfoils, respectively.

11. An aircraft which comprises:
   port and starboard side airfoils;
   port side and starboard side turboprop engines each being capable of discharging heated engine bleed air for in-flight anti-icing protection of the port and starboard airfoils, respectively; and
   the thermo-pneumatic anti-icing system according to claim 1 operatively interconnecting the heated engine bleed air to the port and starboard airfoils to protect the port and starboard airfoils against inflight icing.

* * * * *